(12) United States Patent
Song et al.

(10) Patent No.: US 9,521,427 B2
(45) Date of Patent: Dec. 13, 2016

(54) METHOD AND APPARATUS FOR ENCODING/DECODING IMAGE IN SPATIAL DOMAIN FOR NOISE COMPONENT

(71) Applicant: SK TELECOM CO., LTD., Seoul (KR)

(72) Inventors: Jinhan Song, Seoul (KR); Jeongyeon Lim, Seongnam-si (KR); Kibaek Kim, Seoul (KR); Jechang Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 787 days.

(21) Appl. No.: 13/910,367

(22) Filed: Jun. 5, 2013

(65) Prior Publication Data

US 2013/0259133 A1 Oct. 3, 2013

Related U.S. Application Data

(63) Continuation of application No. PCT/KR2011/009391, filed on Dec. 6, 2011.

(30) Foreign Application Priority Data

Dec. 6, 2010 (KR) .................. 10-2010-0123514

(51) Int. Cl.
*H04N 19/12* (2014.01)
*H04N 19/593* (2014.01)
(Continued)

(52) U.S. Cl.
CPC .......... *H04N 19/593* (2014.11); *H04N 19/12* (2014.11); *H04N 19/129* (2014.11); *H04N 19/14* (2014.11);
(Continued)

(58) Field of Classification Search
None
See application file for complete search history.

(56) References Cited

U.S. PATENT DOCUMENTS

| | | | | |
|---|---|---|---|---|
| 2006/0274956 A1* | 12/2006 | Sohn | ............. | H04N 19/176 382/238 |
| 2007/0160151 A1* | 7/2007 | Bolton | ............. | H04N 7/24 375/240.25 |
| 2009/0097552 A1* | 4/2009 | Jeong | ............. | H04N 19/176 375/240.03 |

FOREIGN PATENT DOCUMENTS

| | | |
|---|---|---|
| JP | 2009089267 | 4/2009 |
| KR | 1020100029343 | 3/2010 |
| KR | 1020100079037 | 7/2010 |

OTHER PUBLICATIONS

International Search Report mailed May 8, 2012 for PCT/KR2011/009391.

* cited by examiner

*Primary Examiner* — Eileen Adams
(74) *Attorney, Agent, or Firm* — Hauptman Ham, LLP

(57) ABSTRACT

A method and apparatus for encoding and decoding an image in a spatial domain for noise components are provided. The method and apparatus generate a prediction block by predicting a current block, generate a residual block by subtracting the prediction block from the current block, decide whether the number of noise components of the residual block is in a predetermined range, determine a coding domain, when a determined coding domain is a frequency domain, transform quantize the residual block, when the determined coding domain is a spatial domain, quantize the residual block and encode information on the determined coding domain and a generated quantized block, or quantize the noise components and encode and decode (Continued)

information on quantized noise components, and a number and locations of the noise components.

14 Claims, 11 Drawing Sheets

(51) Int. Cl.
  *H04N 19/176* (2014.01)
  *H04N 19/46* (2014.01)
  *H04N 19/129* (2014.01)
  *H04N 19/14* (2014.01)
  *H04N 19/18* (2014.01)
  *H04N 19/85* (2014.01)
  *H04N 19/61* (2014.01)
(52) U.S. Cl.
  CPC ............ *H04N 19/176* (2014.11); *H04N 19/18* (2014.11); *H04N 19/46* (2014.11); *H04N 19/61* (2014.11); *H04N 19/85* (2014.11)

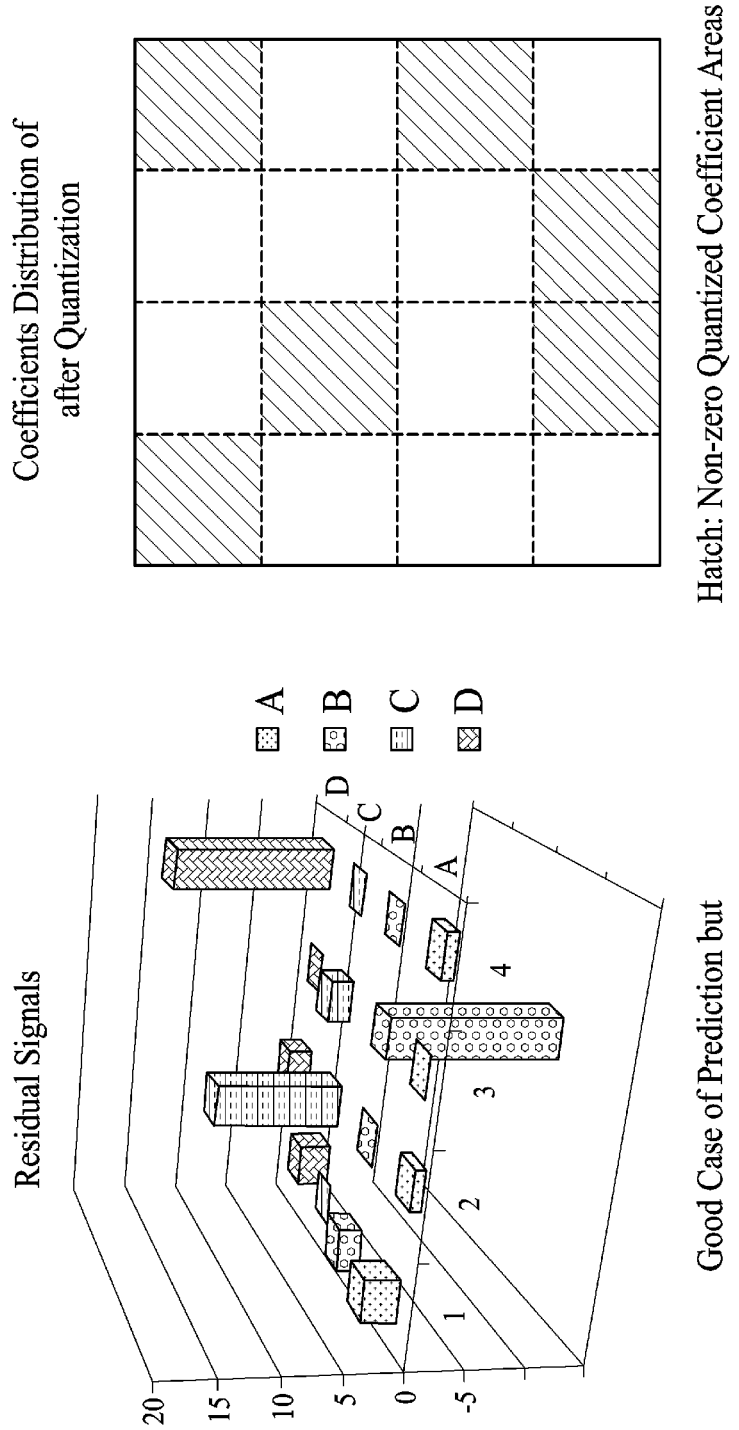

*FIG. 4A*

Residual Signals

| a | b | c | d |
|---|---|---|---|
| e | f | g | H |
| i | j | K | l |
| m | n | o | p |

*FIG. 4B*

| z | z | z | z |
|---|---|---|---|
| z | z | z | z |
| z | z | K | z |
| z | H | z | z |

METHOD AND APPARATUS FOR ENCODING/DECODING IMAGE IN SPATIAL DOMAIN FOR NOISE COMPONENT

CROSS-REFERENCE TO RELATED APPLICATION

The present application is a continuation of International Patent Application No. PCT/KR2011/009391, filed Dec. 6, 2011, which is based on and claims priority to Korean Patent Application No. 10-2010-0123514, filed on Dec. 6, 2010. The disclosures of the above-listed applications are hereby incorporated by reference herein in their entirety.

FIELD

The present disclosure relates to a method and apparatus for encoding and decoding an image in a spatial domain for noise components.

BACKGROUND

The statements in this section merely provide background information related to the present disclosure and may not constitute prior art.

The inventor(s) has noted that since moving image data is large in size, a compression process is required so as to store or transmit the moving image data. Typically, moving image data is encoded by performing intra prediction or inter prediction, transform, quantization, and entropy coding on each picture of the moving image data in units of blocks. Prediction is performed so as to reduce data redundancy in moving images. Data redundancy can be reduced by utilizing intra prediction in which prediction is performed based on neighboring blocks by using spatial redundancy, or by utilizing inter prediction in which motion estimation and motion compensation are performed by using temporal redundancy. The inventor(s), however, has experienced that in the bad case of prediction, some components having large values may be included in a residual signal generated by the prediction. Further, the inventor(s) has experienced that the presence of badly predicted components may degrade compression performance.

SUMMARY

In accordance with some embodiments, a video encoding apparatus comprises a predictor, a subtractor, a noise detector, a transformer, a first quantizer, a second quantizer, and an encoder. The predictor is configured to generate a prediction block by predicting a current block. The subtractor is configured to generate a residual block by subtracting the prediction block from the current block. The noise detector is configured to decide if a number of noise components of the residual block is in a preset range, and determine a coding domain. The transformer is configured to transform the residual block if the determined coding domain is a frequency domain. The first quantizer is configured to quantize the transformed residual block to generate a first quantized block. The second quantizer is configured to quantize the residual block to generate a second quantized block if the determined coding domain is a spatial domain. And the encoder configured to encode information of the determined coding domain and the first or second quantized block generated by the first quantizer or the second quantizer, respectively.

In accordance with some embodiments, a video decoding apparatus comprises a decoder, a first dequantizer, an inverse transformer, a second dequantizer, a predictor and an adder. The decoder is configured to reconstruct coding domain information and a quantized block from a bitstream. The first dequantizer is configured to dequantize the quantized block, if the coding domain information represents a frequency domain coding, so as to reconstruct a transformed residual block. The inverse transformer configured to inversely transform the transformed residual block into a residual block. The second dequantizer is configured to dequantize the quantized block including noise components, if the coding domain information represents a spatial domain coding, so as to reconstruct the residual block. The predictor is configured to predict a current block so as to generate a prediction block. And the adder is configured to add the prediction block to the reconstructed residual block so as to reconstruct the current block.

In accordance with some embodiments, the video encoding apparatus is configured to predict a current block to generate a prediction block; subtract the prediction block from the current block to generate a residual block; decide if a number of noise components of the residual block is in a preset range, and determining a coding domain; transform the residual block if the determined coding domain is the frequency domain; firstly quantize the transformed residual block to generate a first quantized block; secondly quantize the residual block to generate a second quantized block if the determined coding domain is the spatial domain; and encode information of the determined coding domain and the first or second quantized block generated by the firstly quantizing or the secondly quantizing, respectively.

In accordance with some embodiments, the video decoding apparatus is configured to decode coding domain information and a quantized block from a bitstream; firstly dequantize the quantized block if the coding domain information represents a frequency domain coding so as to reconstruct a transformed residual block; inversely transform the transformed residual block into a residual block; secondly dequantize the quantized block including noise components by the number in a preset range if the coding domain information represents a spatial domain coding to reconstruct the residual block; predict a current block to generate a prediction block; and add the prediction block to the reconstructed residual block so as to reconstruct the current block.

BRIEF DESCRIPTION OF DRAWINGS

FIGS. 3A and 3B are exemplary diagrams of predicted residual signals with remaining noise components and quantized blocks;

FIGS. 4A and 4B are exemplary diagrams of detected noise components H and K among residual signals and the remaining residual signals padded with an arbitrary value according to at least one embodiment;

DETAILED DESCRIPTION

The present disclosure provides an apparatus and a method for encoding/decoding images in spatial domain, which can improve encoding performance by adaptively encoding components in spatial domain in a case where some noise components having large values are included in a residual signal due to bad prediction when image are encoded by intra prediction or inter prediction.

Hereinafter, a video encoding apparatus and a video decoding apparatus described below may be user terminals such as a personal computer (PC), a notebook computer, personal digital assistant (PDA), portable multimedia player (PMP), PlayStation Portable (PSP), wireless communication terminal, smart phone, TV and the like, or server terminals such as an application server, service server and the like, and may refer to various apparatuses including a communication apparatus such as a communication modem and the like for performing communication with various types of devices or a wired/wireless communication network, memory for storing various types of programs and data for encoding or decoding a video, or performing an inter or intra prediction for the encoding or decoding, and a microprocessor and the like for executing the program to perform an operation and control.

Further, a video encoded into a bitstream by the video encoding apparatus may be transmitted in real time or non-real-time to the video decoding apparatus through wired/wireless communication networks such as the Internet, wireless personal area network (WPAN), wireless local area network (WLAN), WiBro (wireless broadband, aka WiMax) network, mobile communication network and the like or through various communication interfaces such as a cable, a universal serial bus (USB) and the like, and thus decoded in the video decoding apparatus and reconstructed and reproduced as the video.

A video typically may include a series of pictures each of which is divided into predetermined areas, such as frames or blocks. When the area of the video is partitioned into blocks, the partitioned blocks may be classified into an intra block or an inter block depending on an encoding method. The intra block means a block that is encoded through an intra prediction coding method which generates a predicted block by predicting a pixel of a current block by using pixels of a reconstructed block that underwent previous encoding and decoding and then encodes a differential value between the predicted block and the pixel of the current block within a current picture where the current encoding is performed. The inter block means a block that is encoded through an inter prediction encoding which generates the predicted block by predicting the current block in the current picture through referencing one or more past pictures or future pictures and then encoding the differential value of the predicted block from the current block. Here, the picture that is referenced in encoding or decoding the current picture is called a reference picture.

Figure 1:
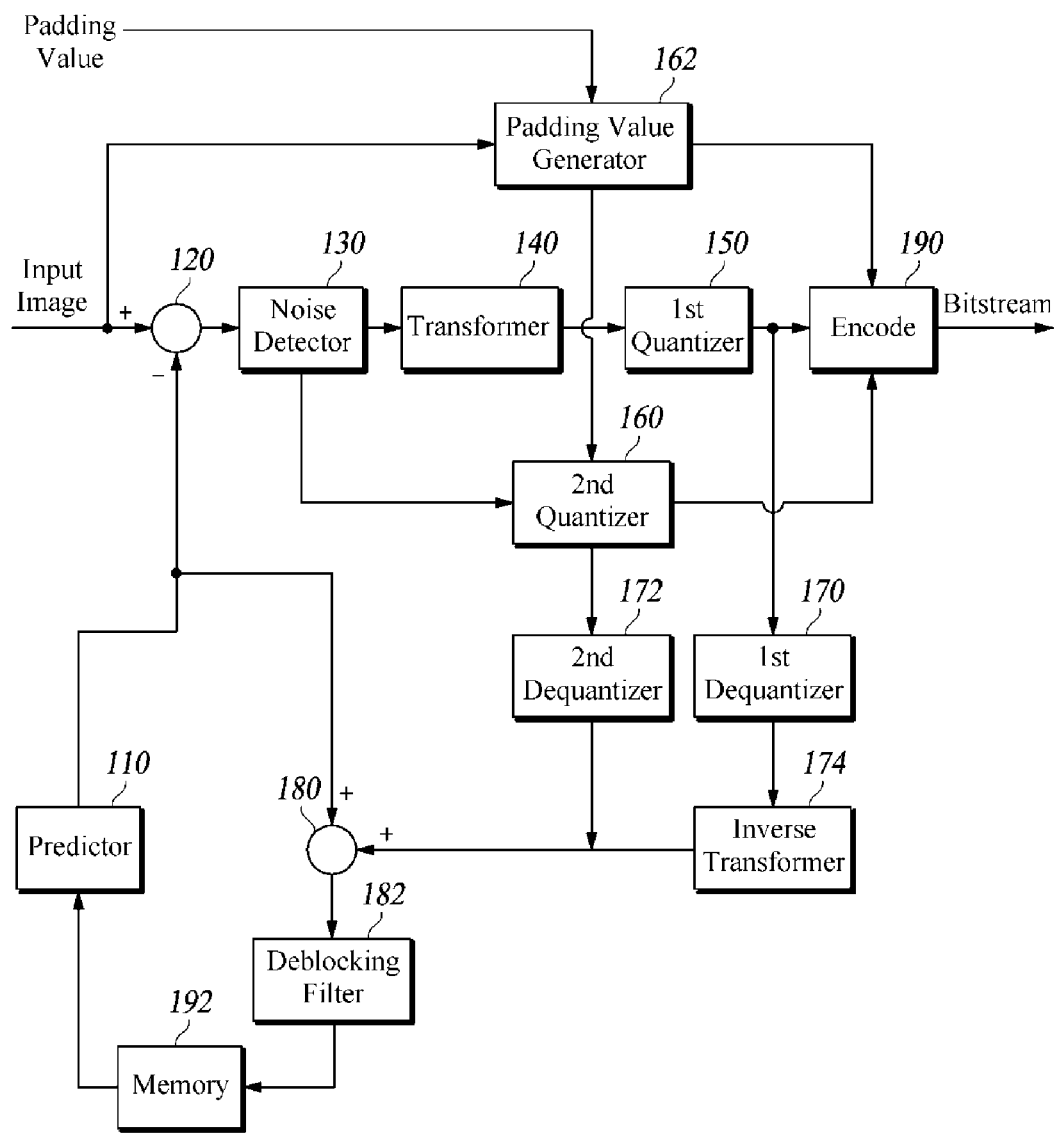
FIG. 1 is a schematic block diagram of a video encoding apparatus according to at least one embodiment.

FIG. 1 is a schematic block diagram of a block configuration of a video encoding apparatus according to at least one embodiment.

A video encoding apparatus 100 is adapted for encoding an image and includes a predictor 110, a subtractor 120, a noise detector 130, a transformer 140, a first quantizer 150, a second quantizer 160, a first dequantizer 170, a second dequantizer 172, an inverse-transformer 174, an adder 180, a deblocking filter 182, an encoder 190 and a memory 192, and occasionally further includes a padding value generator 162. Some components of the above configuration are not necessarily included, and, according to implementations, some or all thereof may be selectively included.

Input images to be encoded are input by block unit, and, in the present disclosure, a block may be M×N. M×N indicates a size of a block and may have various sizes. M and N may have various values in size, and each value of M and N may be the same or different.

The predictor 110 generates a prediction block by predicting a target block to be encoded currently in an image by using intra-prediction or inter-prediction. In other words, the predictor 110 generates a prediction block having with predicted values generated by predicting a current block in an input image through intra prediction or inter prediction.

The subtractor 120 generates a residual block by subtracting the prediction block from the target block to be encoded (i.e., a current block). In other words, the subtractor 120 generates the residual block including a residual signal having a block shape by calculating differences between the pixel values of respective pixels in the target block to encode and the predicted pixel values of respective pixels in the prediction block predicted by the predictor 110.

The noise detector 130 detects whether the number of the noise components of the residual block is in a predetermined range. Specifically, the noise detector 130 may determine with respect to each of residual signal components in the residual block that a threshold-equivalent or over-threshold absolute value of the corresponding residual signal represents a noise with a strong possibility. In other words, a large-signal element remaining in the obtained residual block through the prediction can be determined to be a positive noise. In this case, the predetermined range may be defined by a lower limit and an upper limit. The lower limit may have a value of 1 or more, and the upper limit may be equal to or less than the number of all pixels within the residual block. This is because a smaller number of noise components than the lower limit existing in the residual block represents that encoding in a spatial domain is probably an inefficient method, and an equal or greater number of the noise components than the upper limit remaining in the residual block represents that the corresponding block to encode is highly probable to be such a complex image in the first place that an encoding in a spatial domain is an inefficient option therefor.

Figure 2B:
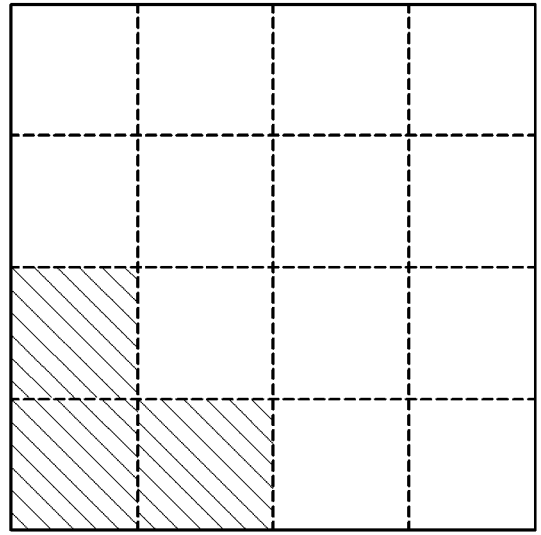
FIGS. 2A and 2B are schematic diagrams of successfully predicted residual signals and quantized blocks.
Figure 2A:
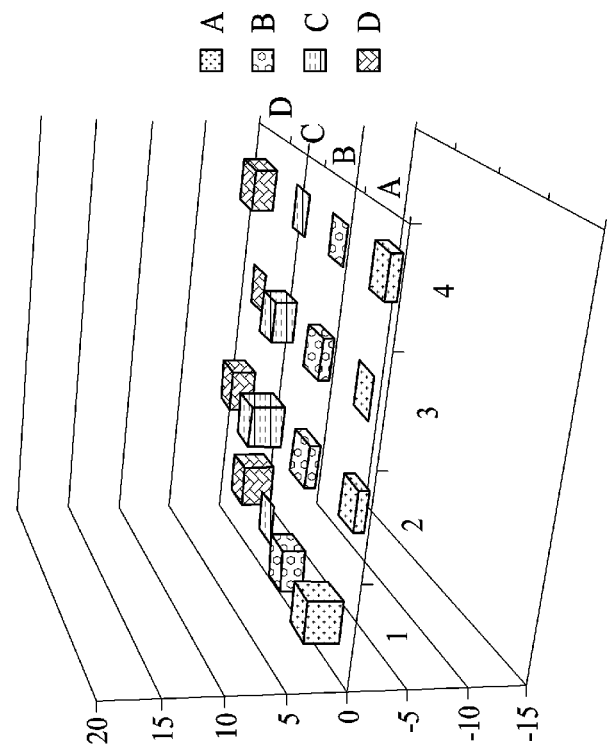

FIGS. 2A and 2B are schematic diagrams of successfully predicted residual signals and quantized blocks.

When frequency coefficients are generated by transforming a residual signal of a residual block into a frequency domain, the residual signal is decomposed into low frequency components and high frequency components. When frequency coefficients decomposed in this way are quantized, if prediction is performed successfully with no noise components remaining in the residual block as in FIG. 2A, values are crowded at the locations of the frequency coefficients of low frequency components including DC (direct current) components, and the frequency coefficients of the high frequency components have small values in the quantized block as in FIG. 2B. After quantization, nonzero values are crowded at the locations of the frequency coefficients of the low frequency components including the DC components, so that high compression efficiency can be obtained when encoding the quantized frequency coefficients. The successful prediction of the residual block less a noise component with complete subsequent transform and quantization brings nonzero quantized coefficients to encode which are depicted by the shadow areas in FIG. 2B.

FIGS. 3A and 3B are exemplary diagrams of predicted residual signals with remaining noise components and quantized blocks.

When noise components are included in a residual block as in FIG. 3A, nonzero quantized coefficients may be distributed irregularly as in FIG. 3B. Due to the residual signals of the noise components existing within the residual block, values are generated at the locations of high frequency coefficients after transform, so that the nonzero quantized coefficients are generated even in a high frequency region, and, therefore, scanning such nonzero quantized coefficients causes the nonzero value to be generated even in the end of a quantized coefficient string, resulting in an increased data amount of a bitstream. In other words, a successful prediction can reduce the data amount of an encoded bitstream, but an occurrence of some noise components leads to large values of the quantized coefficients of the high frequency components, so that the data amount of the encoded bitstream increases to deteriorate the compression efficiency. As a result, when some noise components are included in the residual block, encoding is to be efficiently performed.

In addition, the noise detector 130 can adaptively determine a coding domain for the residual block when the number of noise components within the residual block is in a predetermined range. Making no adaptive determination of the coding domain for the residual block when it has too small or too large number of noise components, the noise detector 130 can adaptively determine whether encoding the residual block is to be performed in a frequency domain or a spatial domain when the number of noise components within the residual block is in a predetermined range.

An exemplary method for making the adaptive determination of the coding domain when the number of noise components within the residual block is in a predetermined range is to calculate the costs of coding the residual block with respect to the frequency domain (coding the residual block after transforming and quantizing) and the spatial domain (coding the residual block without transforming but after quantizing) and to choose between one of the two cases, which provides a better rate-distortion cost performance. Although the method of comparing between the coding costs involves the rate-distortion cost performance for example, the present disclosure is not limited thereto.

When the determined coding domain is the frequency domain, the transformer 140 transforms the residual block into the frequency domain, whereby transforming the respective block pixel values into frequency coefficients. In this case, the transformer 140 can transform residual signals into a frequency domain by using various methods for transforming a spatial image signals into the frequency domain counterpart, such as Hadamard transform, DCT (discrete cosine transform) based transform, or the like. Then, the residual signals, transformed into the frequency domain, become the frequency coefficients.

The first quantizer 150 quantizes the transformed residual block to generate a first quantized block. The first quantizer 150 quantizes the residual block having the frequency coefficients which are transformed into the frequency domain by the transformer 130. In this case, the first quantizer 150 quantizes the transformed residual block by using a dead zone uniform threshold quantization (hereinafter, referred to as "DZUTQ") or a quantization method improved from the DZUTQ, or the like.

The second quantizer 160 quantizes the residual block to generate a second quantized block when the determined coding domain is the spatial domain. The second quantizer 160 can follow suit the first quantizer 150 to quantize the transformed residual block by using DZUTQ, quantization weighted matrix, a quantization scheme improved from the DZUTQ, or the like.

In this case, the second quantizer 160 may pad the remaining components except the noise components with an arbitrary value followed by quantizing the residual block to generate a block. The arbitrary value may be a predetermined value, for example, '0'.

When there are residual signals H and K detected as noise components among residual signals as illustrated in FIG. 4A, the remaining residual signals may be set to an arbitrary value 'z' as illustrated in FIG. 4B as the noise components H and K are quantized to generate quantized blocks. Assuming the value of a residual signal is, for example 2, processing the value through reconstruction steps of transform, quantization, subsequent dequantization and inverse transform could add either a negatively quantized error by 3 toward reconstructed value of −1 or a positively quantized error by 1 toward reconstructed value of 3. The remaining residual signals except the noise components may bypass the reconstruction steps and be set as described above to arbitrary value '0' resulting in absolute error value 2 which is compared unfavorably with the positively quantized and smaller absolute error value of 1 from undertaking the reconstruction steps of the transform, quantization, subsequent dequantization and inverse transform.

Meanwhile, for when the negatively quantized error is added, performing the reconstruction steps on the residual signal of 2 through the transform, quantization, subsequent dequantization and inverse transform generates absolute value error 3, whereas setting the good remaining residual signals into '0' generates absolute value error 2 which is compared favorably with performing the reconstruction steps in generating smaller error. As in the above-described example, when a residual signal having a small absolute value is reconstructed through the transform, quantization, subsequent dequantization and inverse transform, the reconstructed signal may change from the positive to negative value or from the negative to positive value, and therefore, when the signal level is properly adjusted to detect some residual signals of noise components, the remaining residual signals except the noise components are set to an arbitrary value (for example, 0), whereby obviating the need for a separate encoding operation on the remaining residual signals to prevent any loss of signal.

The second quantizer 160 receives the padding value from the padding value generator 162 to set up a padding value.

The padding value generator 162 generates information on the padding value and transmits the information to the second quantizer. The generated information on the padding value may be transmitted to the encoder 190 and be then encoded into a bitstream. The padding value information may be input from the outside, or may be set up through various methods, such as a method of analyzing an image and setting up a padding value. The padding value information may be generated by any unit of a sequence, a picture, a slice, a block and a sub-block, but the present disclosure is not limited thereto.

The encoder 190 encodes information on the determined coding domain, and the first or second quantized block generated by the first quantizer 150 or second quantizer 160, respectively.

The encoder 190 encodes a quantized frequency coefficient string, or the blocks quantized into a spatial domain by using entropy encoding scheme, or the like to output a bitstream. Such encoding technology includes, but is not necessarily limited to an entropy encoding technique, and various other encoding techniques may be used.

In addition, the encoder 190 can include not only a bit string resulting from encoding quantized blocks, not also various information required to decode the encoded bit string, in encoded data. That is, the encoded data may include a coded block pattern (CBP), a delta quantization parameter, the bit string resulting from encoding the quantized blocks, and a bit sting for information needed for prediction.

In addition, the encoder 190 may use the best one among a plurality of scan methods of scanning the coefficients of the quantized blocks generated by the second quantizer, and may encode and insert information on the used scan method in a bitstream. The encoder 190 may calculate respective encoding costs of the plurality of candidate scan methods and then select a scan method providing a predetermined rate-distortion cost performance, preferably an excellent rate-distortion cost performance, more preferably the best rate-distortion cost performance among the candidate scan methods. In this case, although the rate-distortion cost performance is taken in this example for comparing the encoding costs, the present disclosure is not limited thereto.

In addition, the encoder 190 may receive the information on a padding value and encode the information by any unit of a sequence, a picture, a slice, a block and a sub-block.

Figure 5B:
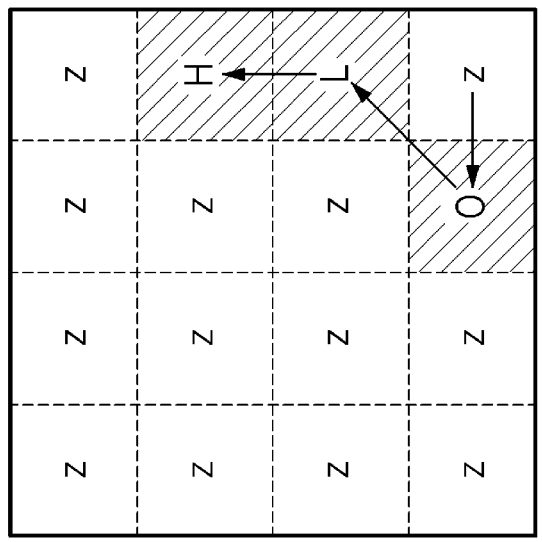
FIGS. 5A and 5B are exemplary diagrams of two types of candidate scan methods according to at least one embodiment.
Figure 5A:
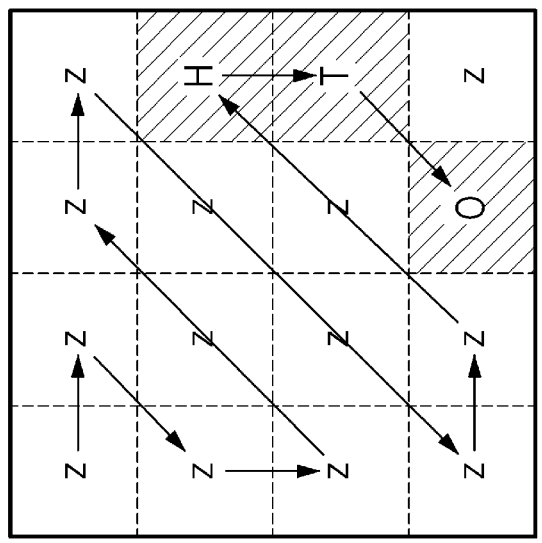

FIGS. 5A and 5B are exemplary diagrams of two types of candidate scan methods.

The encoder 190 may select one of two candidate scan methods which may include a scanning from an upper left block as in FIG. 5A and another scanning from a lower right block as in FIG. 5B.

While 264/AVC codes coefficients in a zigzag sequence starting from a location corresponding to the DC location of a frequency transformed block, the present disclosure can choose a starting location for scanning as determined according to one of various methods including the zigzag scanning method. This is because the occasional noise components in the frequency domain at an area corresponding to the high frequency location as in FIG. 5 render the existing upper right staring of the coefficient coding ineffective.

The entire signal components corresponding to z, except for noise components, are reconstructed by padding the components with an arbitrary value (in this example, '0'). The locations of z components represent portions having no information to be further encoded. In a case where some noise components are generated in the right lower portion of the block as shown in FIGS. 5A and 5B, if encoding is performed by scanning from the left upper location of the block, the number of coefficients to be encoded increases, resulting in a reduction in efficiency. When assuming that the scan start order is provided with two candidates (left upper location and right lower location), it may be more efficient that the number of coefficients to be encoded is reduced by starting scanning from the right lower portion as shown in FIG. 5B, and only the scan start location information is encoded and transmitted to the video decoding apparatus.

Figure 6A:
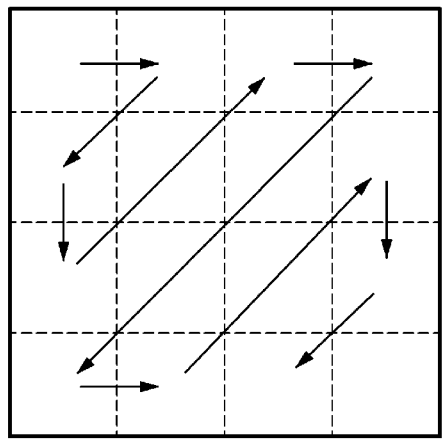
FIGS. 6A and 6D are exemplary diagrams of other candidate scan methods than a zigzag scan method according to at least one embodiment of the present disclosure.
Figure 6B:
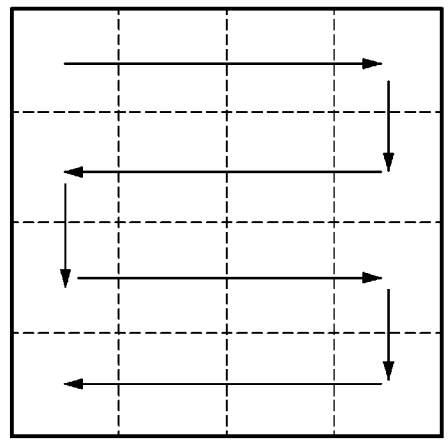
Figure 6C:
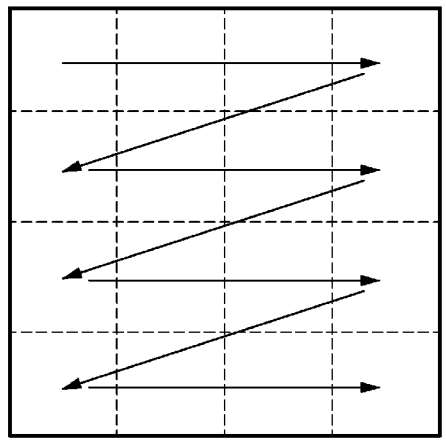
Figure 6D:
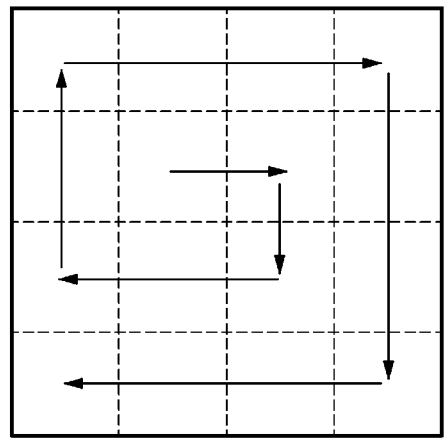

FIGS. 6A and 6D are exemplary diagrams of other candidate scan methods than the zigzag scan method.

As shown in FIGS. 6A and 6D, the scan start location may be selected from such different candidate start locations and then encoded. In other words, encoding may be performed with a scan start location selected from the different candidate start locations as in FIGS. 6A and 6D. The candidate scan methods according to one or more embodiments of the present disclosure are not limited to the examples of FIGS. 5A to 6D, and various other candidate scan methods may be used.

Meanwhile, if the determined coding domain is the spatial domain, the second quantizer 160 may quantize noise components and transmit the quantized noise components to the encoder 190. Instead of performing the encoding by using the scan method, the encoder 190 can encode the noise components and encode the quantized blocks in the spatial domain by encoding information of the number and locations of the noise components. Specifically, the encoder 190 can receive and encode the noise components quantized by the second quantizer 160 and the information of the number and locations of the noise components.

If the coding domain information represents a "frequency domain encoding, the first dequantizer 170 can reconstruct the transformed residual block by dequantizing the quantized block. The first dequantizer 170 dequantizes the first quantized block generated by the first quantizer 150. Specifically, the first dequantizer 170 generates the residual block having frequency coefficients by dequantizing the quantized frequency coefficients of the quantized residual block.

The inverse transformer 174 inversely transforms the transformed residual block generated by the first dequantizer 170. In other words, by inversely transforming the frequency coefficients of the frequency-transformed residual block, the inverse transformer 174 generates the residual block having pixel values, that is, the reconstructed residual block. In this case, the inverse transformer 174 may perform the inverse transform through an inversed performance of the transform method used by the transformer 140.

When the second quantizer 160 generates the quantized block including noise components by the number within a preset range, the second dequantizer 172 reconstructs the residual block by dequantizing the second quantized block generated by the second quantizer 160.

When the second quantizer 160 generates the information of the quantized noise components and the number and locations of the noise components, the second dequantizer 172 reconstructs the residual block from the generated information.

The adder 180 reconstructs the target of the current block, by adding the prediction block obtained by the predictor 110 and the residual block reconstructed by the inverse transformer 174 or the residual block reconstructed by the second dequantizer 172. The reconstructed target block may pass through the deblocking filter 182 which removes block distortion or the like by deblocking-filtering the reconstructed current block. The memory 192 may store the deblocking-filtered current block which may be used as a reference block for when the next block of the target block or other subsequent block is encoded.

Figure 7:
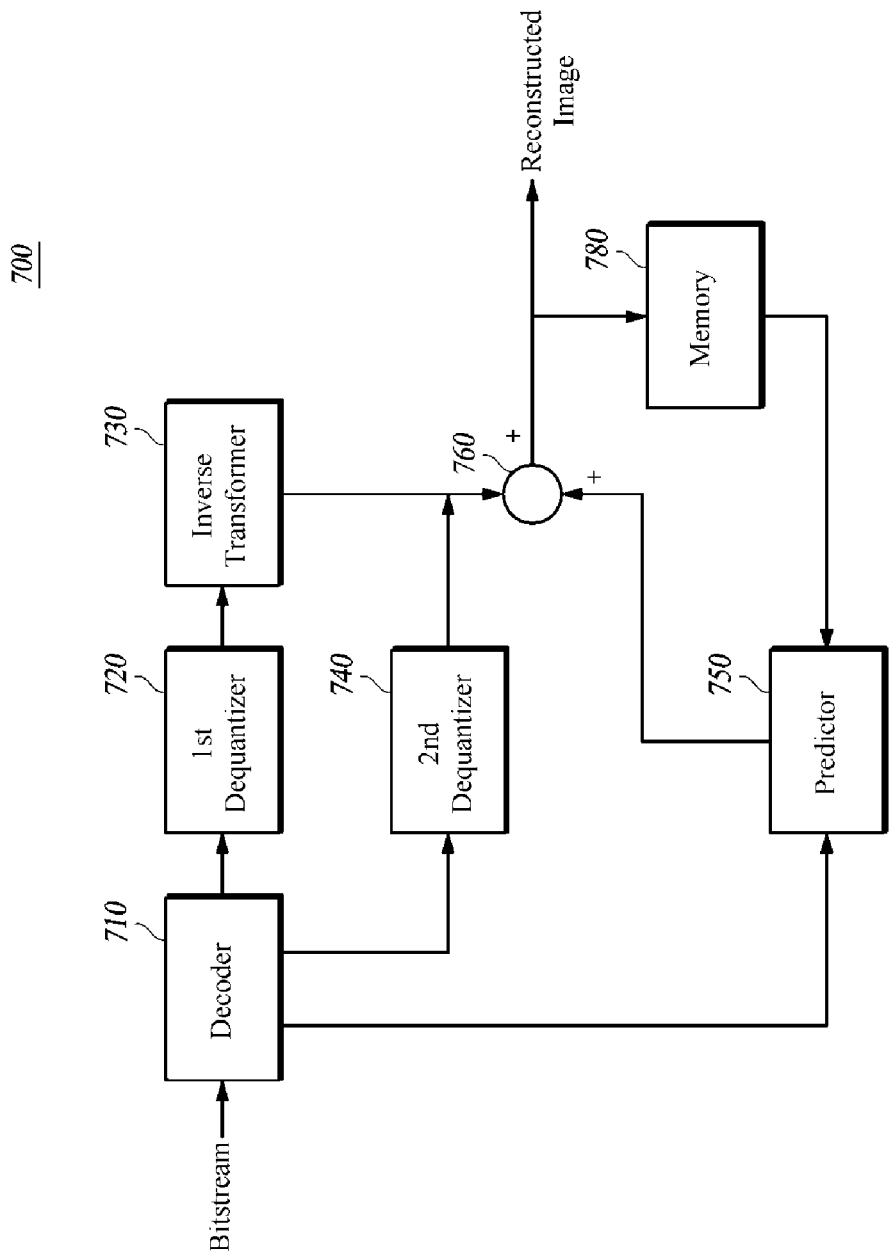
FIG. 7 is a schematic block diagram of a configuration of a video decoding apparatus according to at least one embodiment of the present disclosure.

FIG. 7 is a schematic block diagram of a configuration of a video decoding apparatus 700 according to one or more embodiments of the present disclosure.

The video decoding apparatus 700 according to one or more embodiments of the present disclosure may include a decoder 710, a first dequantizer 720, an inverse transformer 730, a second dequantizer 740, a predictor 750, an adder 760 and a memory 780.

The decoder 710 decodes (or reconstructs) coding domain information and quantized blocks from the bitstream. If the extracted coding domain information represents a "frequency domain encoding", the first dequantizer 720 reconstructs the transformed residual block by dequantizing the quantized blocks, and the inverse transformer 730 reconstructs residual block by inversely transforming the transformed residual block. Since the first dequantizer 720 and the inverse transformer 730 perform identical or similar functions to those of the first dequantizer 170 and the inverse transformer 174 described above with reference to FIG. 1, a detailed description thereof will be omitted.

The decoder 710 decodes (or reconstructs) the coding domain information from the bitstream. If the reconstructed coding domain information represents a "spatial domain coding", the decoder 710 may further decode information of the scan method. The decoder 710 may use the method indicated by the decoded information of the scan method to reconstruct the quantized block in the spatial domain by inversely scanning the quantized coefficient string included in the bitstream.

Meanwhile, the decoder 710 may carry out the quantized block reconstruction by padding the remaining signal except the noise components with a preset padding value. In this case, the padding value may be set to '0'. If a prearrangement is made to exchange the information of the padding value between the video encoding apparatus and the video decoding apparatus, the decoder 710 may decode the padding value information from the bitstream, and reconstruct (or decode) the quantized block by padding the remaining signal except the noise components with the decoded padding value. In this case, the information of the padding value may be decoded in any one of units of sequence, picture, slice, block and sub-block. Herein, the noise component represents that the absolute value of the relevant residual signal is equal to or greater than a threshold value. The noise component may use a value prearranged with the video encoding apparatus, and the threshold value to be applied may change according to embodiments.

If the extracted coding domain information represents a "spatial domain encoding", the second dequantizer 740 reconstructs the residual block by dequantizing the reconstructed quantized block including the noise components, the number of which is in the preset range.

The predictor 750 generates the prediction block by predicting the current target block to decode with the use of the intra prediction or inter prediction. In other words, the predictor 750 generates the prediction block by using the intra prediction mode or inter prediction mode decoded by the decoder 710.

The adder 760 reconstructs the current block by adding the prediction block to the reconstructed residual block. The target block to decode, now reconstructed by the adder 760, is stored in the memory 780 and may be used as a reference picture for when the next block of the targeted block or other later block is reconstructed.

Meanwhile, the decoder 710 according to at least another embodiment of the present disclosure decodes (or reconstructs) the coding domain information and the quantized blocks from the bitstream. If the decoded coding domain information represents a "spatial domain encoding, the decoder 710 may further decode the information of the quantized noise components, and the number and locations of the noise components.

In this case, the second dequantizer 740 may reconstruct the residual block by using the information of the quantized noise components, and the number and locations of the noise components. In the residual block to be reconstructed, the quantized block may be reconstructed by padding components other than the noise components with a preset padding value. In this case, the preset padding value may be set to '0'. If a prearrangement is made to exchange the padding value information between the video encoding apparatus and the video decoding apparatus, the decoder 710 may provide the value for use, which it obtained by decoding the information of the padding value from the bitstream. In this case, the padding value information may be decoded in any one of units of sequence, picture, slice, block and sub-block.

The video encoding/decoding apparatus according to one or more embodiments of the present disclosure may be implemented by connecting a bitstream output terminal of the video encoding apparatus 100 of FIG. 1 to a bitstream input terminal of the video decoding apparatus 700 of FIG. 7.

The video encoding/decoding apparatus according to one or more embodiments of the present disclose includes a video encoder and a video decoder. The video encoder is configured to generate a prediction block by predicting a current block, generate a residual block by subtracting the prediction block from the current block, find if the number of noise components of the residual block is in a preset range, and determine coding domain, transform the residual block and quantize the transformed residual block if the determined coding domain is a frequency domain, quantize the residual block if the determined coding domain is a spatial domain, encode information of the determined coding domain and the generated quantized block or quantize the noise components, and encode the information of the quantized noise components, and the number and locations of the noise components. The video decoder is configured to decode the coding domain information and the quantized block from the bitstream, reconstruct the residual block by dequantizing and inversely transforming the decoded quantized block if the decoded coding domain information represents a frequency domain coding, reconstruct the residual block by dequantizing the decoded quantized block including noise components, the number of which is in a preset range, if the decoded coding domain information represents a spatial domain coding, or reconstruct the residual block by using the information of the quantized noise components extracted from the bitstream, and the number and locations of the noise components, and reconstruct the current block by adding the prediction block to the reconstructed residual block.

Herein, the video encoder may be implemented with the video encoding apparatus 100 according to one or more embodiments of the present disclosure, and the video decoder may be implemented with the video decoding apparatus 700 according to one or more embodiments of the present disclosure.

Figure 8:
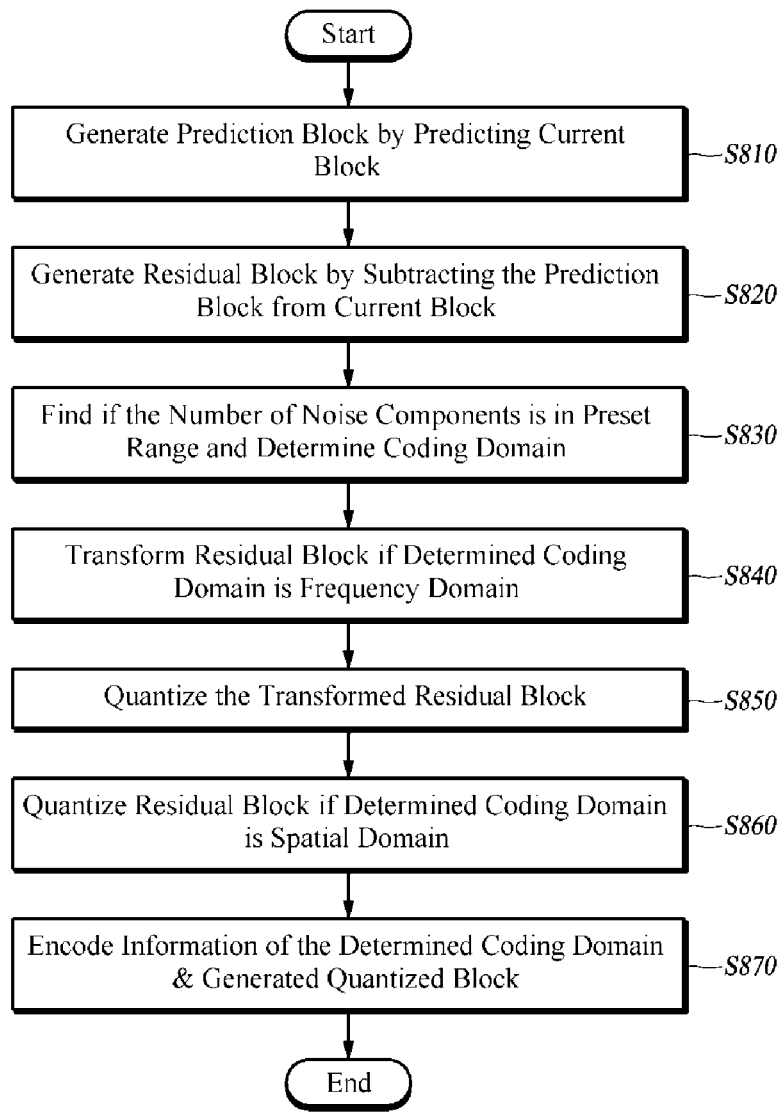
FIG. 8 is a flowchart of a video encoding method according to at least one embodiment of the present disclosure.

FIG. 8 is a flowchart of a video encoding method according to one or more embodiments of the present disclosure.

A video encoding method, according to one or more embodiments of the present disclosure, is performed by a video encoding apparatus and includes: generating a prediction block by predicting a current block (S810); generating a residual block by subtracting the prediction block from the current block (S820); finding if a number of noise components of the residual block is in a preset range, and determining coding domain (S830); transforming the residual block if the determined coding domain is the frequency domain (S840); firstly quantizing the transformed residual block to generate a first quantized block (S850); secondly quantizing the residual block to generate a second quantized block if the determined coding domain is a spatial domain (S860); and encoding information of the determined coding domain and the first or second quantized block generated by the firstly quantizing or the secondly quantizing, respectively in step S850 or S860 (S870). Based on viewpoint of the video encoding apparatus to perform the method in FIG. 8, the video encoding apparatus is configured to predict a current block to generate a prediction block; subtract the prediction block from the current block to generate a residual block; decide if a number of noise components of the residual block is in a preset range, and determining a coding domain; transform the residual block if the determined coding domain is the frequency domain; firstly quantize the transformed residual block to generate a first quantized block; secondly quantize the residual block to generate a second quantized block if the determined coding domain is the spatial domain; and encode information of the determined coding domain and the first or second quantized block generated by the firstly quantizing or the secondly quantizing, respectively.

Figure 9:
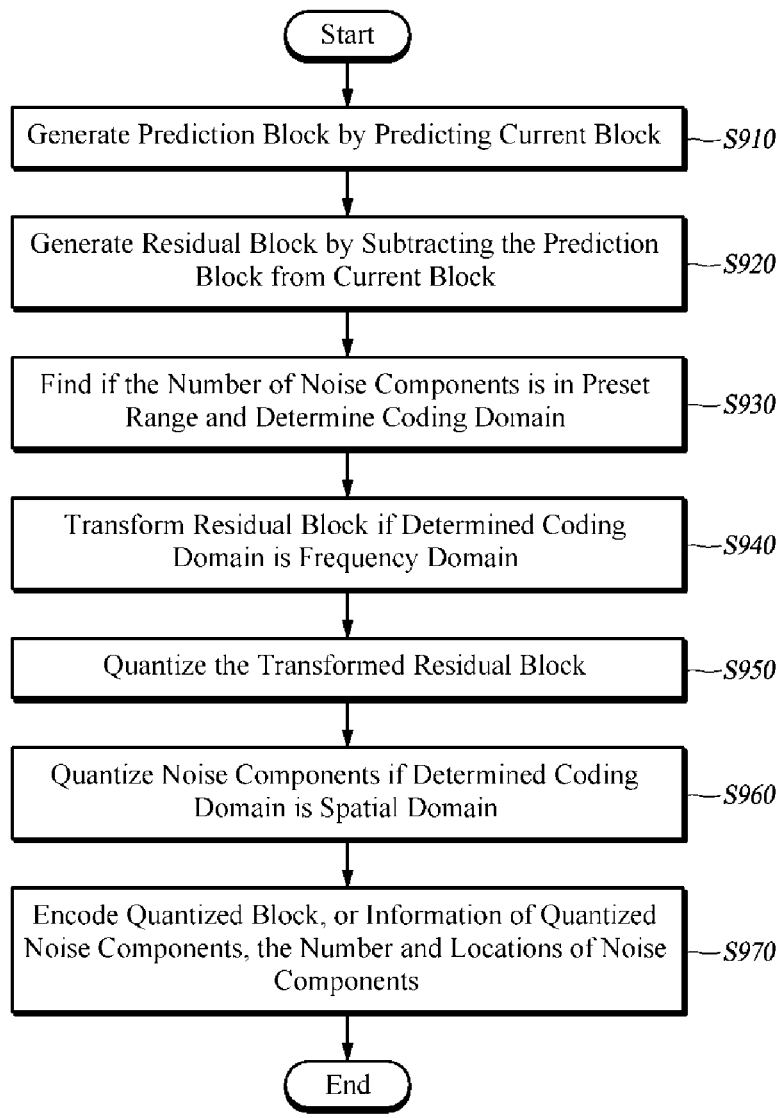
FIG. 9 is a flowchart of a video encoding method according to at least another embodiment of the present disclosure.

FIG. 9 is a flowchart of a video encoding method according to at least another embodiment of the present disclosure.

A video encoding method, according to at least another embodiment of the present disclosure, is performed by the video encoding apparatus. For performing the video encoding method, the video encoding apparatus is configured to generate a prediction block by predicting a current block (S910); generate a residual block by subtracting the prediction block from the current block (S920); find if the number of noise components of the residual block is in a preset range, and determine coding domain (S930); transform the residual block if the determined coding domain is a frequency domain (S940); quantize the transformed residual block (S950); quantize noise components if the determined coding domain is a spatial domain (S960); and encode the block quantized in step S950, or encode information of the noise components quantized in step S960, and the number and locations of the noise components (S970).

Herein, since steps S810 and S910 may correspond to the operations of the predictor 110, steps S820 and S920 to subtractor 120, steps S830 and S930 to noise detector 130, steps S840 and S940 to transformer 140, steps S850 and S950 to first quantizer 150, steps S860 and S960 to second quantizer 160, and steps S870 and S970 to encoder 190, detailed descriptions thereof will be omitted.

Figure 10:
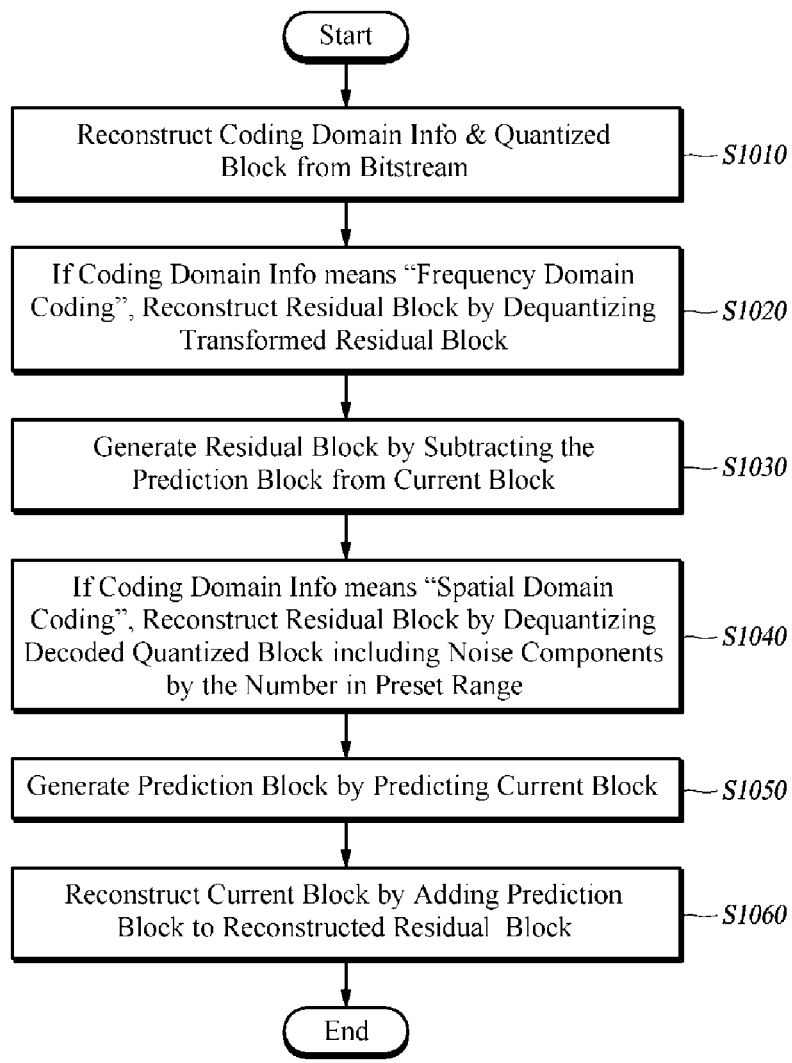
FIG. 10 is a flowchart of a video decoding method according to at least one embodiment of the present disclosure.

FIG. 10 is a flowchart of a video decoding method according to one or more embodiments of the present disclosure.

A video decoding method, according to one or more embodiments of the present disclosure, performed by the video decoding apparatus. For performing the video decoding method, the video decoding apparatus is configured to decode coding domain information and a quantized block from a bitstream (S1010); firstly dequantize the decoded quantized block if the decoded coding domain information represents a frequency domain coding to reconstruct a transformed residual block (S1020); inversely transform the transformed residual block to reconstruct a residual block (S1030); secondly dequantize the decoded quantized block including noise components by the number in a preset range if the decoded coding domain information represents a spatial domain coding to reconstruct the residual block (S1040); predict the current block to generate a prediction block (S1050); and add the prediction block to the reconstructed residual block to reconstruct the current block (S1060). Based on viewpoint of the video encoding apparatus to perform the method in FIG. 10, the video decoding apparatus is configured to decode coding domain information and a quantized block from a bitstream; firstly dequantize the decoded quantized block if the coding domain information represents a frequency domain coding so as to reconstruct a transformed residual block; inversely transform the transformed residual block into a residual block; secondly dequantize the decoded quantized block including noise components by the number in a preset range if the coding domain information represents a spatial domain coding to reconstruct the residual block; predict a current block to generate a prediction block; and add the prediction block to the reconstructed residual block so as to reconstruct the current block.

Figure 11:
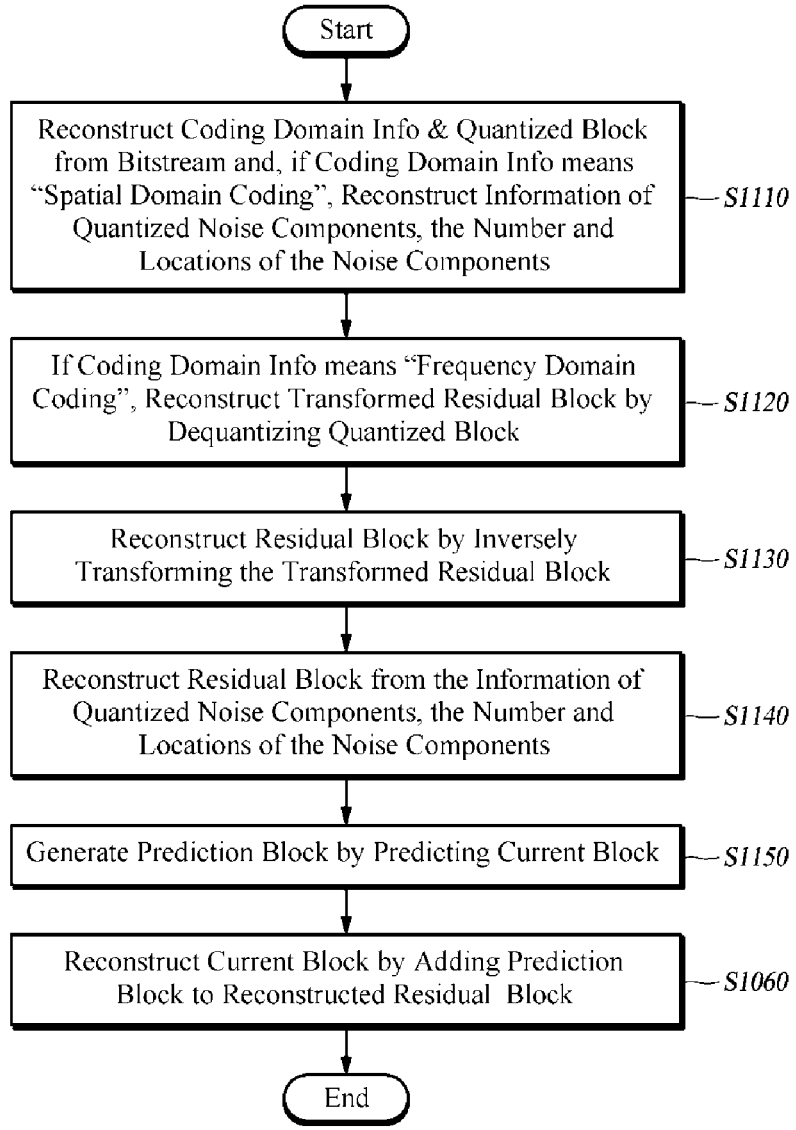
FIG. 11 is a flowchart of a video decoding method according to at least another embodiment of the present disclosure.

FIG. 11 is a flowchart of a video decoding method according to at least another embodiment of the present disclosure.

A video decoding method, according to at least another embodiment of the present disclosure, performed by the video decoding apparatus. For performing the video decoding method, the video decoding apparatus is configured to decode coding domain information and a quantized block from a bitstream, and decode, if the decoded coding domain information represents a frequency domain coding, information of quantized noise components, and the number and locations of noise components (S1110); firstly dequantize a quantized block if the coding domain information represents a frequency domain coding to reconstruct a transformed residual block (S1120); inversely transform the transformed residual block to reconstruct the residual block (S1130); reconstruct the residual block from the information of the quantized noise components, and the number and locations of the noise components to complete a second dequantization (S1140); predict a current block to generate a prediction block (S1150); and add the prediction block to the reconstructed residual block to reconstruct the current block (S1160).

Herein, since steps S1010 and S1110 may correspond to the operations of the decoder 710, steps S1020 and S1120 to first dequantizer 720, steps S1030 and S1130 to inverse transformer 730, steps S1040 and S1140 to second dequantizer 740, steps S1050 and S1150 to predictor 750, and steps S1060 and S1160 to adder 760, detailed descriptions thereof will be omitted.

The video encoding and decoding method according to one or more embodiments of the present disclosure may be implemented by integrating the video encoding method according to one or more embodiments and the video decoding method according to one or more embodiments.

A video encoding and decoding method according to one or more embodiments of the present disclosure includes: generating a prediction block by predicting a current block, generating a residual block by subtracting the prediction block from the current block, deciding if the number of noise components of the residual block is in a preset range, determining a coding domain, transforming the residual block and quantizing the transformed residual block if the determined coding domain is a frequency domain, quantizing the residual block if the determined coding domain is a spatial domain, encoding information of the determined coding domain and the generated quantized block or quantizing the noise components, and finally encoding the information of the quantized noise components and the number and locations of the noise components. The video encoding and decoding method further include decoding coding domain information and a quantized block from a bitstream, dequantizing and inversely transforming the decoded quantized block if the decoded coding domain information represents a frequency domain coding to reconstruct a residual block, and dequantizing the decoded quantized block including noise components by the number in a preset range if the decoded coding domain information represents a spatial domain coding to reconstruct the residual block, or reconstructing the residual block by using the information of the quantized noise components extracted from the bitstream and the number and locations of the noise components, and adding the prediction block to the reconstructed residual block to reconstruct the current block.

According to the present disclosure as described above, the coding performance is improved by adaptively encoding components in spatial domain in a case where some noise components having large values are included in a residual signal due to bad prediction when image are encoded by intra prediction or inter prediction.

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the various characteristics of the disclosure. That is, it is understood that the present disclosure should not be limited to these embodiments but various changes and modifications can be made by one ordinarily skilled in the art within the subject matter, the spirit and scope of the present disclosure as hereinafter claimed. Specific terms used in this disclosure and drawings are used for illustrative purposes and not to be considered as limitations of the present disclosure. Exemplary embodiments of the present disclosure have not been described for limiting purposes.

Accordingly, the scope of claimed invention is not to be limited by the above embodiments.

What is claimed is:

1. A video decoding apparatus, comprising:
a decoder, implemented by a processor, configured to reconstruct coding domain information and an encoded residual block from a bitstream, wherein the coding domain information indicates whether a residual block has been encoded by a frequency domain coding or by a spatial domain coding, wherein
the frequency domain coding is a coding mode for encoding the residual block into frequency-domain values, and
the spatial domain coding is a coding mode for encoding the residual block into spatial-domain values;
an inverse quantizer, implemented by a processor, configured to inversely quantize the encoded residual block;
an inverse transformer, implemented by a processor, configured to inversely transform the inversely quantized residual block from the frequency domain into the spatial domain, based on the coding domain information, wherein
(1) when the coding domain information indicates the frequency domain coding, the inverse transformer configured to
inversely transform the inversely quantized residual block from the frequency domain into the spatial domain,
(2) when the coding domain information indicates the spatial domain coding, the inverse transformer configured to
skip a step of inversely transforming the inversely quantized residual block;
a predictor, implemented by a processor, configured to generate a predicted block corresponding to the residual block; and
an adder, implemented by a processor, configured to reconstruct a current block based on the coding domain information by
(A) adding the predicted block to the inversely transformed residual block when the coding domain information indicates the frequency domain coding, and
(B) adding the predicted block to the inversely quantized residual block when the coding domain information indicates the spatial domain coding.

2. The apparatus of claim 1, wherein the decoder is configured to reconstruct the encoded residual block by extracting, from the bitstream, information on values and locations of noise components among residual signals within the residual block, when the coding domain information indicates the spatial domain coding.

3. The apparatus of claim 2, wherein the decoder is configured to reconstruct the encoded residual block by padding remaining components of the residual block except the noise components with a padding value, when the coding domain information indicates the spatial domain coding.

4. The apparatus of claim 3, wherein the padding value is extracted in the unit of a sequence, a picture or a slice from the bitstream.

5. The apparatus of claim 1, wherein the predictor is configured to generate the predicted block by using an intra prediction.

6. The apparatus of claim 5, wherein the residual block has a size of 4×4.

7. The apparatus of claim 6, wherein the decoder is configured to
   select a scan pattern from among a plurality of scan patterns, and
   reconstruct the encoded residual block by scanning residual signals using the selected scan pattern.

8. A method implemented by a video decoding apparatus including a processor, the method comprising:
   reconstructing coding domain information and an encoded residual block from a bitstream, wherein the coding domain information indicates whether a residual block has been encoded by a frequency domain coding or by a spatial domain coding, wherein
      the frequency domain coding is a coding mode for encoding the residual block into frequency-domain values, and
      the spatial domain coding is a coding mode for encoding the residual block into spatial-domain values;
   generating a predicted block corresponding to the residual block;
   reconstructing the residual block from the encoded residual block based on the coding domain information; and
   reconstructing a current block by adding the reconstructed residual block to the predicted block,
   wherein (1) when the coding domain information indicates the frequency domain coding, the reconstruction of the residual block from the encoded residual block comprises
      inversely quantizing the encoded residual block, and
      inversely transforming the inversely quantized residual block, and
   (2) when the coding domain information indicates the spatial domain coding, the reconstruction of the residual block from the encoded residual block comprises
      inversely quantizing the encoded residual block, and
      skipping a step of inversely transforming the inversely quantized residual block.

9. The method of claim 8, wherein the encoded residual block is reconstructed by extracting, from the bitstream, information on values and locations of noise components among residual signals within the residual block, when the coding domain information indicates the spatial domain coding.

10. The method of claim 9, wherein the encoded residual block is reconstructed by padding remaining components of the residual block except the noise components with a padding value, when the coding domain information indicates the spatial domain coding.

11. The method of claim 10, wherein the padding value is extracted in the unit of a sequence, a picture or a slice from the bitstream.

12. The method of claim 8, wherein the predicted block is generated by using an intra prediction.

13. The method of claim 12, wherein
the residual block has a size of 4×4.

14. The method of claim 13, wherein the reconstruction of the encoded residual block comprises:
   selecting a scan pattern from among a plurality of scan patterns, and
   scanning residual signals using the selected scan pattern to thereby reconstruct the encoded residual block.

* * * * *